(12) United States Patent
Sun et al.

(10) Patent No.: US 11,265,730 B2
(45) Date of Patent: Mar. 1, 2022

(54) DATA PROCESSING METHOD ADAPTED TO ACCESS NETWORK ARCHITECTURE, ACCESS NETWORK ARCHITECTURE SYSTEM AND STORAGE MEDIUM

(71) Applicant: CHINA MOBILE COMMUNICATIONS CORPORATION, Beijing (CN)

(72) Inventors: Junshuai Sun, Beijing (CN); Yingying Wang, Beijing (CN); Xueyan Huang, Beijing (CN); Chih-Lin I, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 661 days.

(21) Appl. No.: 16/077,967

(22) PCT Filed: Dec. 30, 2016

(86) PCT No.: PCT/CN2016/113861
§ 371 (c)(1),
(2) Date: Aug. 14, 2018

(87) PCT Pub. No.: WO2017/140184
PCT Pub. Date: Aug. 24, 2017

(65) Prior Publication Data
US 2021/0195431 A1 Jun. 24, 2021

(30) Foreign Application Priority Data
Feb. 18, 2016 (CN) .......................... 201610091390.7

(51) Int. Cl.
*H04W 16/18* (2009.01)
*H04L 69/321* (2022.01)
*H04L 69/322* (2022.01)

(52) U.S. Cl.
CPC ........... *H04W 16/18* (2013.01); *H04L 69/321* (2013.01); *H04L 69/322* (2013.01)

(58) Field of Classification Search
CPC . H04B 7/15507; H04L 1/1614; H04L 1/1896; H04L 1/1685; H04L 69/322;
(Continued)

(56) References Cited

U.S. PATENT DOCUMENTS 8,780,938 B2 * 7/2014 Lerzer .................... H04L 69/12
370/473
8,817,806 B2 * 8/2014 Kim ........................ H04L 43/00
370/413

(Continued)

FOREIGN PATENT DOCUMENTS

CN 101370281 A 2/2009
CN 101594374 A 12/2009
(Continued)

OTHER PUBLICATIONS

International Search Report and Written Opinion for corresponding International Patent Application No. PCT/CN2016/109921, dated Mar. 1, 2017, 12 pages (includes English translations).

(Continued)

*Primary Examiner* — Man U Phan
(74) *Attorney, Agent, or Firm* — Arch & Lake LLP (57) ABSTRACT

The present disclosure provides a data processing method adapted to access network architecture, and the access network architecture. The data processing method includes: providing a data distribution and reordering module; acquiring, by the data distribution and reordering module, control information, the control information including information about a byte length of the data distributed over an air-interface channel and information about an air-interface link during air-interface cell switch; and distributing, by the data (Continued)

distribution and reordering module, data received from a PDCP layer toward a central RLC layer/a remote RLC layer in accordance with the control information, reordering data from the central RLC layer/remote RLC layer, and transmitting the reordered data to the PDCP layer.

14 Claims, 4 Drawing Sheets

(58) Field of Classification Search
CPC .............. H04L 1/188; H04L 1/1874; H04L 2001/0097; H04L 29/08; H04W 28/085; H04W 72/042; H04W 76/15; H04W 16/32; H04W 28/08
USPC .......................................................... 370/328
See application file for complete search history.

(56) References Cited

U.S. PATENT DOCUMENTS

| | | | |
|---|---|---|---|
| 9,326,215 B2* | 4/2016 | Cho | H04W 36/02 |
| 9,648,514 B2* | 5/2017 | Blankenship | H04W 72/042 |
| 9,801,204 B2* | 10/2017 | Zhang | H04W 72/1284 |
| 9,871,625 B2* | 1/2018 | Larmo | H04L 1/1607 |
| 10,027,593 B2* | 7/2018 | Zhang | H04L 1/1812 |
| 10,219,317 B2* | 2/2019 | Lee | H04W 72/0413 |
| 10,225,830 B2* | 3/2019 | Zhang | H04L 47/28 |
| 10,306,699 B2* | 5/2019 | Uchino | H04W 28/10 |
| 10,341,887 B2* | 7/2019 | Ogura | H04W 28/02 |
| 10,341,900 B2* | 7/2019 | Zeng | H04W 24/10 |
| 10,440,765 B2* | 10/2019 | Belghoul | H04W 28/0268 |
| 10,863,579 B2* | 12/2020 | Kim | H04W 12/04 |
| 2009/0034476 A1* | 2/2009 | Wang | H04W 36/0011 370/331 |
| 2010/0274921 A1 | 10/2010 | Lerzer | |
| 2011/0188377 A1 | 8/2011 | Kim | |
| 2012/0100845 A1 | 4/2012 | Mildh | |
| 2015/0043435 A1 | 2/2015 | Blankenship | |
| 2015/0117245 A1 | 4/2015 | Zhang | |
| 2016/0373962 A1* | 12/2016 | Wang | H04W 28/065 |
| 2017/0085492 A1* | 3/2017 | Xiao | H04L 47/34 |
| 2017/0111832 A1* | 4/2017 | Wen | H04W 76/16 |
| 2017/0303170 A1* | 10/2017 | Uchino | H04W 76/15 |
| 2021/0059010 A1* | 2/2021 | Kim | H04W 12/106 |

FOREIGN PATENT DOCUMENTS

| | | |
|---|---|---|
| CN | 102461281 A | 5/2012 |
| CN | 102857965 A | 1/2013 |
| CN | 103796287 A | 5/2014 |
| CN | 104581824 A | 4/2015 |
| CN | 104955064 A | 9/2015 |
| CN | 105101253 A | 11/2015 |
| CN | 105264930 A | 1/2016 |

OTHER PUBLICATIONS

International Search Report and Written Opinion (including English translations) for corresponding International Patent Application No. PCT/CN2016/113861, dated Mar. 24, 2017, 11 pages.

Chinese Office Action (including English translation) issued in CN201610091390.7, dated Apr. 16, 2019, 13 pages.

* cited by examiner

FIG. 1 (Prior Art)

acquiring, by a data distribution and reordering module, control information, the control information including information about a byte length of the data distributed over an air-interface channel and information about an air-interface link during air-interface cell switch

201 distributing, by the data distribution and reordering module, data received from a PDCP layer toward a central RLC layer / a remote RLC layer in accordance with the control information, reordering data from the central RLC layer / remote RLC layer, and transmitting the reordered data to the PDCP layer

DATA PROCESSING METHOD ADAPTED TO ACCESS NETWORK ARCHITECTURE, ACCESS NETWORK ARCHITECTURE SYSTEM AND STORAGE MEDIUM

CROSS-REFERENCE TO RELATED APPLICATION

This application is the U.S. national phase of PCT Application No. PCT/CN2016/113861 filed on Dec. 30, 2016, which claims the priority to Chinese Patent Application No. 201610091390.7 filed on Feb. 18, 2016, the entire content of which is incorporated in its entirety by reference herein for all purposes.

TECHNICAL FIELD

The present disclosure relates to the field of a wireless access technology, in particular to a data processing method adapted to access network architecture, an access network architecture system, and a storage medium.

BACKGROUND

Figure 1:
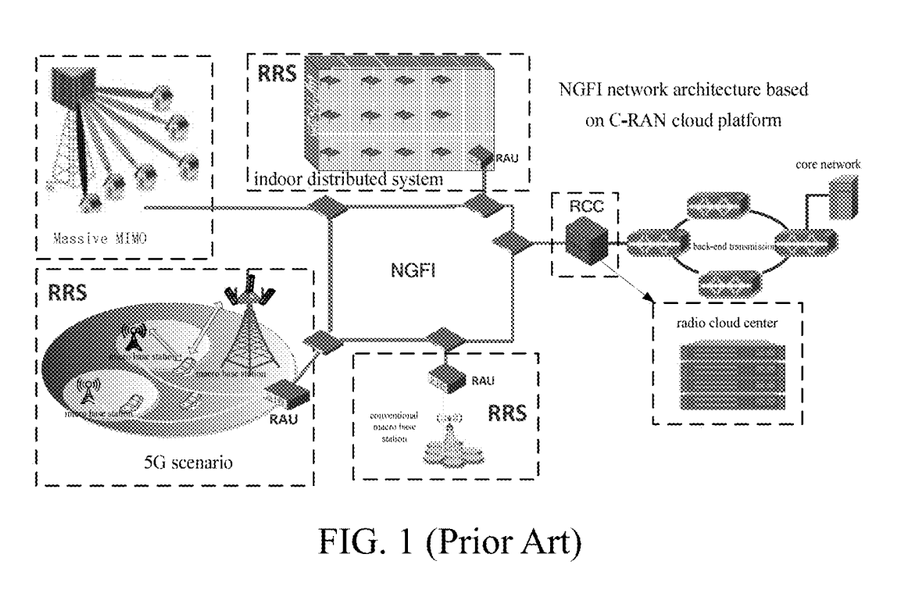
FIG. 1 is a schematic view showing conventional NGFI network architecture.

Next Generation Fronthaul Interface (NGFI) network architecture based on Centralized, Cooperative, Cloud & Clean-Radio Access Network (C-RAN) cloud platform is adapted to various $2^{nd}$-Generation (2G), $3^{rd}$-Generation (3G), $4^{th}$-Generation (4G) and $5^{th}$-Generation (5G) scenarios through a flexible fronthaul interface. As shown in FIG. 1, after a big data operation, a Radio Cloud Center (RCC) transmits an instruction to a Remote Radio System (RRS), and then the RRS allocates resources for corresponding air interfaces in accordance with an operation result from the RRC. Identically, each RRS processes information collected through the air interface, and then reports the processed information to the RCC. The RCC is flexibly connected to the RRS. In order to reduce a data transmission volume between the RCC and the RRS, functions of the RCC and the RRS may be divided flexibly. The RCC and the RRS are connected to the C-RAN via a transmission method. A relatively large time delay has been introduced due to the connection between the RCC and the RRS. With reference to performance indices (including transmission time delay and jitter) of a currently-supported Voice over Long Term Evolution (VoLTE) service, a maximum one-way time delay is about 1.5 ms. However, usually a one-way time delay between a Media Access Control (MAC) layer and a Radio Link Control (RLC) layer does not exceed 10 µs. In addition, usually a time delay at the MAC layer between the transmission of a data request and the reception of data from the RLC layer is within 300 µs. Obviously, it is impossible for an RLC/MAC function division mode under a conventional or ideal fronthaul network to be adapted to the NFGI network architecture.

Hence, it is necessary to re-divide functions of a protocol stack in accordance with transmission characteristics of a non-ideal fronthaul network between the RCC and the RRS, so as to be adapted to various performance indices of a non-ideal transmission network between the RCC and the RRS.

In addition, conventional integrated base station architecture may be reserved in a 5G network, i.e., the ideal fronthaul transmission network is adopted between the RCC and the RRS. For this base station architecture, it is unnecessary to re-divide the functions of the protocol stack.

With respect to 5G wireless network architecture where the ideal and the non-ideal fronthaul transmission networks coexist, it is necessary to re-design protocol stack architecture of an access network, so as to be adapted to different network architecture. However, currently there is no scheme for re-designing the protocol stack architecture of the access network.

SUMMARY

An object of the present disclosure is to provide a data processing method adapted to access network architecture, an access network architecture system and a storage medium, so as to solve the above-mentioned problem.

In one aspect, the present disclosure provides in some embodiments a data processing method adapted to access network architecture, including: providing a data distribution and reordering module; acquiring, by the data distribution and reordering module, control information; and distributing, by the data distribution and reordering module, data received from a Packet Data Convergence Protocol (PDCP) layer toward a central RLC layer/a remote RLC layer in accordance with the control information, reordering data from the central RLC layer/remote RLC layer, and transmitting the reordered data to the PDCP layer.

In a possible embodiment of the present disclosure, the data processing method further includes: receiving, by the data distribution and reordering module, configuration signaling from an RRC layer; and selecting, by the data distribution and reordering module, whether to generate the central RLC layer or the remote RLC layer in accordance with the configuration signaling.

In a possible embodiment of the present disclosure, the selecting, by the data distribution and reordering module, whether to generate the central RLC layer or the remote RLC layer in accordance with the configuration signaling includes: when a network side is in an ideal transmission state, generating, by the data distribution and reordering module, the central RLC layer; and when the network side is in a non-ideal transmission state, generating, by the data distribution and reordering module, the remote RLC layer.

In a possible embodiment of the present disclosure, the providing the data distribution and reordering module includes: providing a data distribution and reordering layer between the PDCP layer and the RLC layer, the data distribution and reordering layer corresponding to a function of the data distribution and reordering module; or configuring the function of the data distribution and reordering module in the PDCP layer or the RLC layer.

In a possible embodiment of the present disclosure, when the function of the data distribution and reordering module is configured in the PDCP layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer includes, when the network side is in the ideal transmission state, receiving, by the data distribution and reordering module, a PDCP Packet Data unit (PDU), forwarding the PDCP PDU to the RLC layer, receiving a PDCP PDU reported by the RLC Layer, reordering the reported PDCP PDU, and transmitting the reordered PDCP PDU to the PDCP layer.

In a possible embodiment of the present disclosure, when the function of the data distribution and reordering module is configured in the RLC layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer includes: when the network side is in the ideal transmission state, receiving, by the data distribution and reordering module, an RLC Service Data Unit (SDU) from the PDCP layer, and enabling the RLC layer to distribute the data; transmitting, by the RLC layer, an RLC PDU in accordance with one or more received MAC requests; and after the RLC layer has received data reported by an MAC layer, reordering the received data and reporting, by the data distribution and reordering module, the reordered data to the PDCP layer.

In a possible embodiment of the present disclosure, when the function of the data distribution and reordering module is configured in the RLC layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer includes: when the network side is in the non-ideal transmission state, receiving, by the data distribution and reordering module, an RLC SDU from the PDCP layer, and distributing the received data to the corresponding RLC layer in accordance with a data distribution result indicated by an MAC layer; and upon the receipt of data from a plurality of RLC layers, reordering, by the received data distribution and reordering module, the data and transmitting the reordered data to the PDCP layer.

In a possible embodiment of the present disclosure, the data processing method further includes providing an inter-cell MAC module. The acquiring, by the data distribution and reordering module, the control information includes transmitting, by the inter-cell MAC module, the control information to the data distribution and reordering module. The control information includes information about a byte length of the data distributed over an air-interface channel and information about an air-interface link during air-interface cell switch.

In another aspect, the present disclosure provides in some embodiments a self-adaptive access network architecture system, including a data distribution and reordering module, a PDCP layer and an RLC layer. The data distribution and reordering module is configured to acquire control information, distribute data received from the PDCP layer to a central RLC layer/a remote RLC layer in accordance with the control information, reorder data received from the central RLC layer/the remote RLC layer, and transmit the reordered data to the PDCP layer.

In a possible embodiment of the present disclosure, the access network architecture system further includes an RRC layer. The data distribution and reordering module is further configured to receive configuration signaling from the RRC layer, and select whether to generate the central RLC layer or the remote RLC layer in accordance with the configuration signaling.

In a possible embodiment of the present disclosure, the data distribution and reordering module is further configured to, when a network side is in an ideal transmission state, generate the central RLC layer, and when the network side is in a non-ideal transmission state, generate the remote RLC layer.

In a possible embodiment of the present disclosure, a function of the data distribution and reordering module is configured between the PDCP layer and the RLC layer, or in the PDCP layer or the RLC layer.

In a possible embodiment of the present disclosure, when the function of the data distribution and reordering module is configured in the PDCP layer, the data distribution and reordering module is further configured to, when the network side is in the ideal transmission state, receive a PDCP PDU, forward the PDCP PDU to the RLC layer, reorder the PDCP PDU upon the receipt of a PDCP PDU reported by the RLC layer, and transmit the reordered PDCP PDU to the PDCP layer.

In a possible embodiment of the present disclosure, when the function of the data distribution and reordering module is configured in the RLC layer, the data distribution and reordering module is further configured to, when the network side is in the ideal transmission state, receive an RLC SDU from the PDCP layer, and enable the RLC layer to distribute the data. The RLC layer is configured to transmit the RLC PDU in accordance with one or more received MAC requests, and upon the receipt of data reported by an MAC layer, reorder the data and report the reordered data to the PDCP layer through the data distribution and reordering module.

In a possible embodiment of the present disclosure, when the function of the data distribution and reordering module is configured in the RLC layer, the data distribution and reordering module is further configured to, when the network side is in the non-ideal transmission state, receive an RLC SDU from the PDCP layer, distribute the received data to the corresponding RLC layer in accordance with a data distribution result indicated by the MAC layer, and upon the receipt of the data from a plurality of RLC layers, reorder the data and transmit the reordered data to the PDCP layer.

In a possible embodiment of the present disclosure, the access network architecture further includes an inter-cell MAC module configured to transmit the control information to the data distribution and reordering module. The control information includes information about a byte length of the data distributed over an air-interface channel and information about an air-interface link during air-interface cell switch.

In yet another aspect, the present disclosure provides in some embodiments a storage medium storing therein a computer program. The computer program is executed so as to implement the above-mentioned data processing method.

According to the embodiments of the present disclosure, the data distribution and reordering module is provided so as to acquire the control information, and the control information includes the information about the byte length of the data distributed over the air-interface channel and the information about the air-interface link during the air-interface cell switch. Next, the data distribution and reordering module distributes the data received from the PDCP layer to the central RLC layer/the remote RLC layer in accordance with the control information, reorders the data from the central RLC layer/the remote RLC layer, and transmits the reordered data to the PDCP layer. In addition, the data distribution and reordering module receives the configuration signaling generated by the RRC layer in accordance with the transmission state of the network side, and selects whether to generate the central RLC layer or the remote RLC layer in accordance with the configuration signaling. Through access network protocol stack architecture adapted to the access network architecture, it is able to select a protocol stack function in accordance with the initial configuration signaling, thereby to be adapted to the access network architecture in a better manner. In addition, a new protocol function is provided and capable of being controlled flexibly, so it may not only serve as a protocol layer but also serve as a function between two protocol layers, i.e., the protocol architecture may be adapted to different access network architecture. The protocol architecture has excellent expansibility, so it is able to support a huge number of users rapidly. In addition, the protocol architecture has excellent compatibility, so it is able to be compatible with 3G, 4G and 5G networks.

DETAILED DESCRIPTION OF THE EMBODIMENTS

The present disclosure will be described hereinafter in conjunction with the drawings and embodiments. The drawings merely relate to some embodiments of the present disclosure, but shall not be used to limit the scope of the present disclosure.

Conventional access network architecture is fronthaul architecture in an ideal transmission state, or integrated architecture (i.e., Layer 1, Layer 2 and Layer 3 of an entire access network are located on a base station). Distributed network architecture, e.g., RCC-RRS distributed architecture, has been introduced into a 5G system, and a transmission network between an RCC layer and an RRS layer may be an ideal transmission network or a non-ideal transmission network. In order to be adapted to the two types of network architecture, it is necessary to define protocol stack architecture.

In order to meet the requirement of a 5G radio access network having the distributed architecture, the present disclosure provides in some embodiments a data processing method adapted to access network architecture. The data processing method is implemented through the protocol stack architecture. Through redefining a function of a protocol stack and enabling or disabling the redefined function through configuration signaling, it is able for the access network protocol stack to be adapted to the access network architecture.

Figure 2:
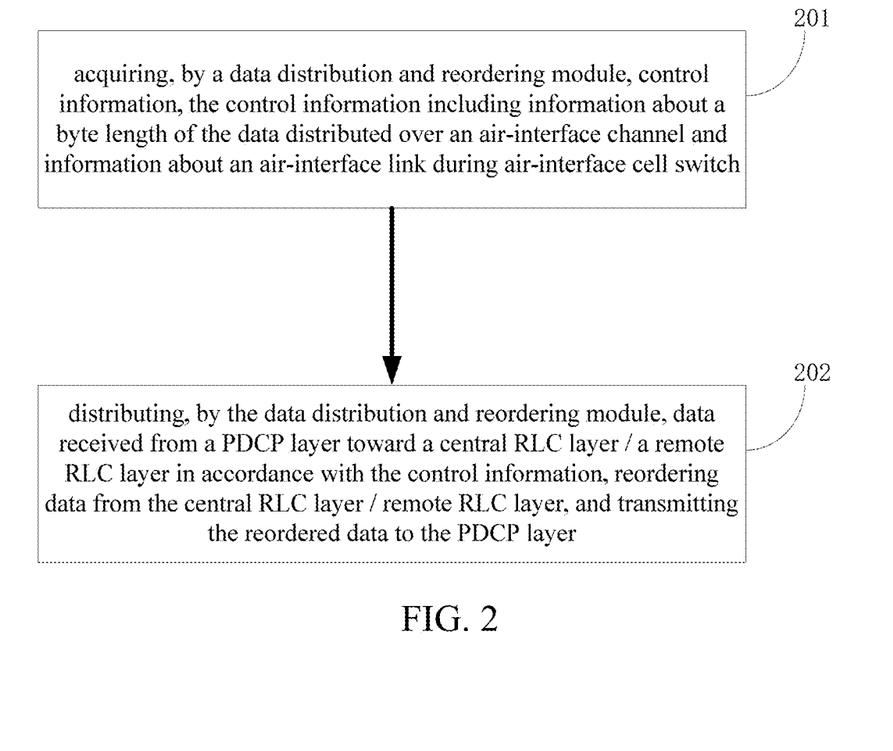
FIG. 2 is a flow chart of a data processing method adapted to access network architecture according to one embodiment of the present disclosure.

As shown in FIG. 2, which is a flow chart of the data processing method adapted to the access network architecture, a data distribution and reordering module is provided, and the data processing method includes the following steps.

Step 201: acquiring, by the data distribution and reordering module, control information. The control information includes information about a byte length of the data distributed over an air-interface channel and information about an air-interface link during air-interface cell switch.

In a possible embodiment of the present disclosure, an inter-cell MAC module is provided. The step of acquiring, by the data distribution and reordering module, the control information includes transmitting, by the inter-cell MAC module, the control information to the data distribution and reordering module.

Figure 3:
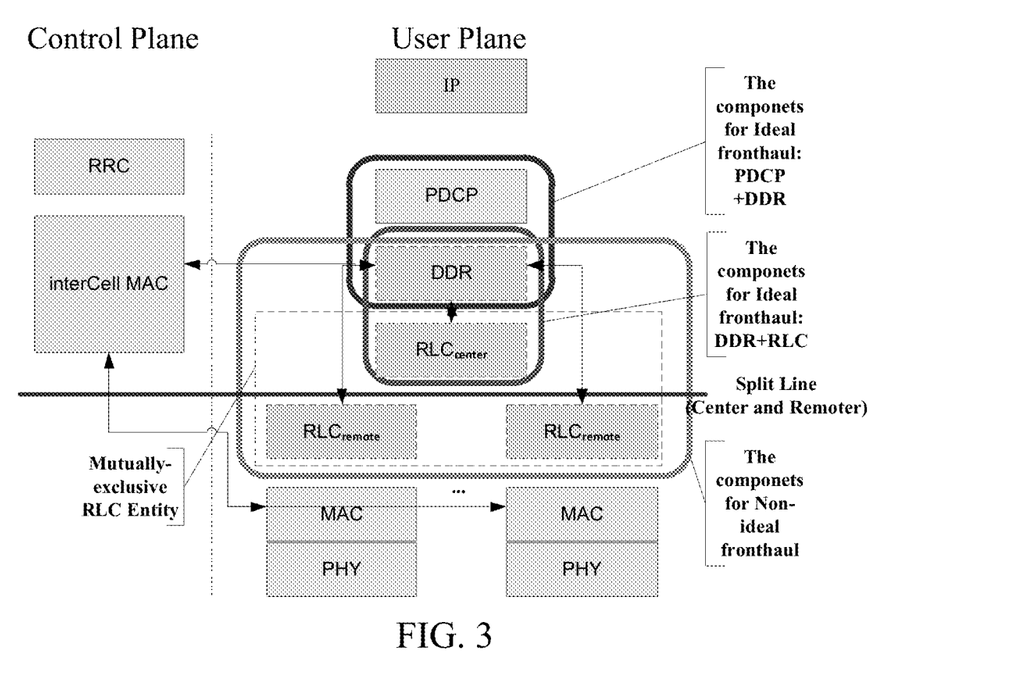
FIG. 3 is a schematic view showing access network protocol stack architecture adapted to the access network architecture according to one embodiment of the present disclosure.

As shown in FIG. 3, which is a schematic view showing the access network protocol stack architecture of the self-adaptive access network architecture system, the access network protocol stack architecture in the embodiments of the present disclosure is designed on the basis of a known access network stack, with a control plane as an RRC layer and a user plane as a PDCP, RLC, MAC or physical (PHY) layer. With respect to the distributed network architecture, the following configurations may be provided.

Configuration 1. The inter-cell MAC module is newly provided and takes charge of control having a real-time performance higher than RRC.

Configuration 2. The data distribution and reordering (DDR) module is newly added and takes charge of the distribution and reception of Radio Bearers (RBs) as well as the control over $RLC_{center}/RLC_{remote}$. Here, the $RLC_{center}$ refers to a central RLC layer and the $RLC_{remote}$ refers to a remote RLC layer.

Configuration 3. The RRC layer is newly provided with an air-interface signaling function, so as to flexibly configure the functions of the PDCP/RLC layers or the DDR module depending on different types of the access network architecture, thereby to be adapted to the ideal access network architecture and the non-ideal access network architecture.

In addition, as indicated by dotted boxes in FIG. 1, an $RLC_{center}$ entity and an $RLC_{remote}$ entity have a same function which is the same as function of a conventional RLC protocol entity. When there is a mutually-exclusive RLC entity, i.e., there is the $RLC_{center}$ layer, no $RLC_{remote}$ layer may occur. Identically, there is the $RLC_{remote}$ layer, no $RLC_{center}$ layer may occur. $RLC_{center}/RLC_{remote}$, MAC and PHY protocol functional entities may change along with a protocol version. In the embodiments of the present disclosure, the protocol functional entities may also be called as layers, e.g., the MAC protocol functional entities may also be called as an MAC layer.

Referring to FIG. 3, apart from controlling a control function of the inter-cell MAC module (i.e., the MAC protocol functional entity in FIG. 1), the inter-cell MAC module may further control the DDR module, including notifying the DDR module of the information about the byte length of the data distributed over each air-interface channel and the information about the air-interface link during the air-interface cell switch.

Referring to FIG. 3 again, the DDR module mainly takes charge of distributing the data received from the PDCP layer to the $RLC_{center}/RLC_{remote}$ layer, reorder the data from the $RLC_{center}/RLC_{remote}$ layer, and transmit the reordered data to the PDCP layer, and control the $RLC_{center}/RLC_{remote}$ layer. During the distribution, the DDR module may distribute the data to each $RLC_{remote}$ layer in accordance with the byte length of the data provided by the MAC layer, and during the reception, the DDR module may reorder the data received on a plurality of $RLC_{remote}$ layers, and transmit the reordered data to the PDCP layer. In addition, the DDR module may receive configuration signaling from the RRC layer, and select whether to generate the $RLC_{center}$ or $RLC_{remote}$ protocol functional entity.

The RRC layer is newly provided with air-interface signaling. Depending on whether a network side is in an ideal transmission state or a non-ideal transmission state, the RRC layer may generate the configuration signaling for the $RLC_{center}/RLC_{remote}$ layer, and transmit the configuration signaling to a User Equipment (UE). Here, the ideal transmission state refers to a state where the base station is of an integrated type, i.e., the protocol stacks are not separated from each other, or although being separated from each other, the protocol stacks communicate with each other via an optical fiber. At this time, a transmission time delay may be at a same order of magnitude as a transmission time delay for a conventional Common Public Radio Interface (CPRI), or the other real-time performances may meet the requirement of data exchange between the protocol entities of the protocol stacks. Otherwise, the network side is in the non-ideal transmission state. When the network side is in the ideal transmission state, merely the $RLC_{center}$ protocol functional entity, rather than the $RLC_{remote}$ protocol functional entity, may be configured by the RRC layer for the DDR module; and when the network side is in the non-ideal transmission state, merely the $RLC_{remote}$ protocol functional entity, rather than the $RLC_{center}$ protocol functional entity, may be configured by the RRC layer for the DDR module. Here, the signaling remains the same at both a base station side and a UE side.

For the above Configuration 3, prior to Step 201, the data processing method further includes: receiving, by the data distribution and reordering module, the configuration signaling generated in accordance with the transmission state of the network side from the RRC layer; and selecting, by the data distribution and reordering module, whether to generate the central RLC layer or the remote RLC layer in accordance with the configuration signaling.

In a possible embodiment of the present disclosure, the providing the data distribution and reordering module includes: providing a data distribution and reordering layer between the PDCP layer and the RLC layer, the data distribution and reordering layer corresponding to a function of the data distribution and reordering module; or configuring the function of the data distribution and reordering module in the PDCP layer or the RLC layer.

Here, the selecting, by the data distribution and reordering module, whether to generate the central RLC layer or the remote RLC layer in accordance with the configuration signaling includes: when the network side is in the ideal transmission state, generating, by the data distribution and reordering module, the central RLC layer; and when the network side is in the non-ideal transmission state, generating, by the data distribution and reordering module, the remote RLC layer.

Step 202: distributing, by the data distribution and reordering module, data received from the PDCP layer toward from central RLC layer/from remote RLC layer in accordance with the control information, reordering data from the central RLC layer/remote RLC layer, and transmitting the reordered data to the PDCP layer.

In a possible embodiment of the present disclosure, when the function of the data distribution and reordering module is configured in the PDCP layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer includes, when the network side is in the ideal transmission state, receiving, by the data distribution and reordering module, a PDCP PDU, forwarding the PDCP PDU to the RLC layer, receiving a PDCP PDU reported by the RLC Layer, reordering the reported PDCP PDU, and transmitting the reordered PDCP PDU to the PDCP layer.

In a possible embodiment of the present disclosure, when the function of the data distribution and reordering module is configured in the RLC layer, the distributing, by the data distribution and reordering module, the data received from the PDCP layer toward the central RLC layer/the remote RLC layer, reordering the data from the central RLC layer/ the remote RLC layer and transmitting the reordered data to the PDCP layer includes: when the network side is in the ideal transmission state, receiving, by the data distribution and reordering module, an RLC SDU from the PDCP layer, and enabling the RLC layer to distribute the data; transmitting, by the RLC layer, an RLC PDU in accordance with one or more received MAC requests; and after the RLC layer has received data reported by an MAC layer, reordering the received data and reporting, by the data distribution and reordering module, the reordered data to the PDCP layer.

In a possible embodiment of the present disclosure, when the function of the data distribution and reordering module is configured in the RLC layer, the distributing, by the data distribution and reordering module, the data received from the PDCP layer toward the central RLC layer/the remote RLC layer, reordering the data from the central RLC layer/ the remote RLC layer and transmitting the reordered data to the PDCP layer includes: when the network side is in the non-ideal transmission state, receiving, by the data distribution and reordering module, an RLC SDU from the PDCP layer, and distributing the received data to the corresponding RLC layer in accordance with a data distribution result indicated by the MAC layer; and upon the receipt of data from a plurality of RLC layers, reordering, by the received data distribution and reordering module, the data and transmitting the reordered data to the PDCP layer.

The DDR module may be of two types. To be specific, the DDR module may be an independent protocol layer equivalent to a DDR protocol functional entity newly provided between a conventional PDCP protocol functional entity and a conventional RLC protocol functional entity. Also, the DDR module may be a function newly configured in the PDCP protocol functional entity or the RLC ($RLC_{center}$/$RLC_{remote}$) protocol functional entity.

Figure 4:
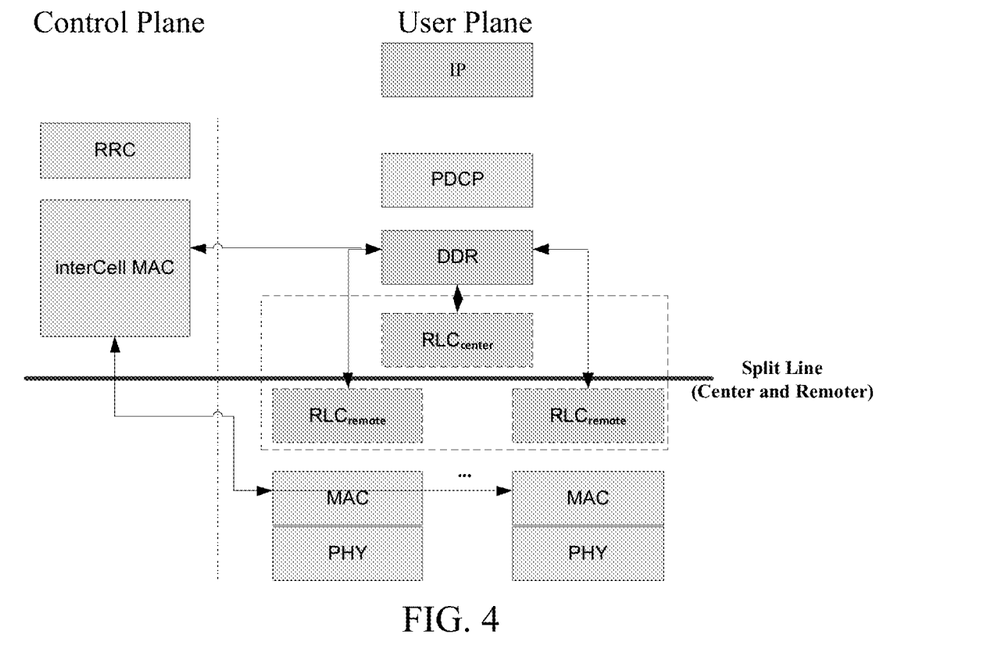
FIG. 4 is another schematic view showing the access network protocol stack architecture adapted to the access network architecture according to one embodiment of the present disclosure.

When the DDR module is of the first type, overall protocol stack architecture is shown in FIG. 3, with three solid, bold boxes and the contents therein being removed. In FIG. 4, the above three protocol functional entities remain unchanged.

When the DDR module is of the second type, the three bold boxes "the components for ideal fronthaul: PDCP+DDR", "the components for ideal fronthaul: DDR+RLC" and "the components for non-ideal fronthaul" in FIG. 3 represent three configurations for the protocol stack function after the DDR module has been configured through RRC signaling.

The components for ideal fronthaul:PDCP+DDR: the DDR module serves as a function newly configured in the PDCP layer, and the DDR module communicates with the PDCP layer via an existing interface. In other words, the DDR module may receive the PDCP PDU, forward it to the RLC layer, receive the PDCP PDUs reported by the RLC layers, reorder the PDCP PDUs, and transmit the reordered PDCP PDUs to the PDCP layer. The DDR module may not change a known PDCP protocol function, and it merely serves as a relatively independent function in the PDCP protocol functional entity.

The components for ideal fronthaul:DDR+RLC: the DDR module serves as a function newly configured in the RLC layer. Because the network side is in the ideal transmission state, the DDR module may be integrated with the RLC protocol entity (i.e., the $RLC_{center}$ protocol functional entity; at this time, no $RLC_{remote}$ protocol functional entity exists).

In this case, the DDR modules may correspond to the RLC layers respectively (in a one-to-one correspondence), and the functions of the DDR module (e.g., data transmission, data reception and data reordering) may be directly implemented as one RLC protocol functional entity, which is equivalent to data passthrough. Upon the receipt of the RLC SDU from a higher layer (i.e., the PDCP layer), the DDR module may directly enable the RLC protocol functional entity to transmit the data. The RLC protocol functional entity may transmit the RLC PDU in accordance with one or more received MAC requests. Upon the receipt of the data reported by a bottom layer (i.e., the MAC layer), the RLC protocol functional entity may reorder the data and transmit it to the DDR module, and then the DDR module may report the data to the PDCP layer. The DDR module may not change a known RLC protocol function, and it merely serves as a relatively independent function in the RLC protocol functional entity.

The components for Non-ideal fronthaul: the DDR module serves as a function newly configured in the RLC layer. Because the network side is in the non-ideal transmission state, the DDR module and the RLC layer (i.e., the $RLC_{remote}$ protocol functional entity; at this time the $RLC_{center}$ protocol functional entity does not exist) are configured in a distributed manner. The DDR module is located at a central point, while the RLC protocol functional entity is located at a remote end. In this case, each DDR module may correspond to several RLC protocol functional entities, and the functions of the DDR module (e.g., data transmission, data reception and data reordering) may be directly implemented as the plurality of RLC protocol functional entities. The DDR module may receive the RLC SDU from the high layer (i.e., the PDCP layer), and distribute the received data to the corresponding RLC layer in accordance with the data distribution result indicated by the MAC layer. Each RLC protocol function entity may correspond to one MAC protocol functional entity. The DDR module may receive the data from the plurality of RLC protocol functional entities, reorder the data, and transmit the reordered data to the PDCP layer. The DDR module may not change the known RLC protocol function, and it merely serves as a relatively independent function in the RLC protocol functional entity.

In the embodiments of the present disclosure, a control relationship between the DDR module and the $RLC_{center}$/$RLC_{remote}$ layer will be described as follows. For the network side, as shown in FIG. 3, the protocol stacks may be segmented at the DDR module and the $RLC_{center}$/$RLC_{remote}$ layer. In the ideal transmission state, upon the receipt of the configuration signaling from the RRC layer, the DDR module may merely generate one RLC protocol functional entity (i.e., the $RLC_{center}$ protocol functional entity; at this time, the $RLC_{remote}$ protocol functional entity does not exist) at the central point. In the non-ideal transmission state, the DDR module may generate the RLC protocol functional entity (i.e., the $RLC_{remote}$ protocol functional entity; at this time, the $RLC_{center}$ protocol functional entity does not exist) at several specified remote ends in accordance with the configuration signaling from the RRC layer.

For the UE side, no distributed architecture exists. Upon the receipt of the RRC configuration signaling from the network side, the DDR module may generate locally the same RLC protocol functional entity as that at the network side, so as to transmit and receive data between peer layers.

In the embodiments of the present disclosure, a control relationship between the inter-cell MAC module and the DDR module will be described as follows.

1) For the network side, as shown in FIG. 3, the inter-cell MAC module may notify the DDR module of the information about the byte length of the data distributed over the air-interface channel and the information about the air-interface link during the air-interface cell switch. When the DDR module is capable of independently acquiring data throughput over each air-interface channel, it is unnecessary for the inter-cell MAC module to provide the data throughput to the DDR module. When the DDR module is capable of acquiring the information about the air-interface link through the RRC layer or the like, it is unnecessary for the inter-cell MAC module to provide the information about the air-interface link to the DDR module.

For the other control information, it is also unnecessary for the inter-cell MAC module to provide it to the DDR module, as long as the DDR module is capable of acquiring the control information in any other ways.

2) For the UE side, because no distributed architecture exists, it is able to control the DDR module by the inter-cell MAC module or the RRC layer.

Figure 5:
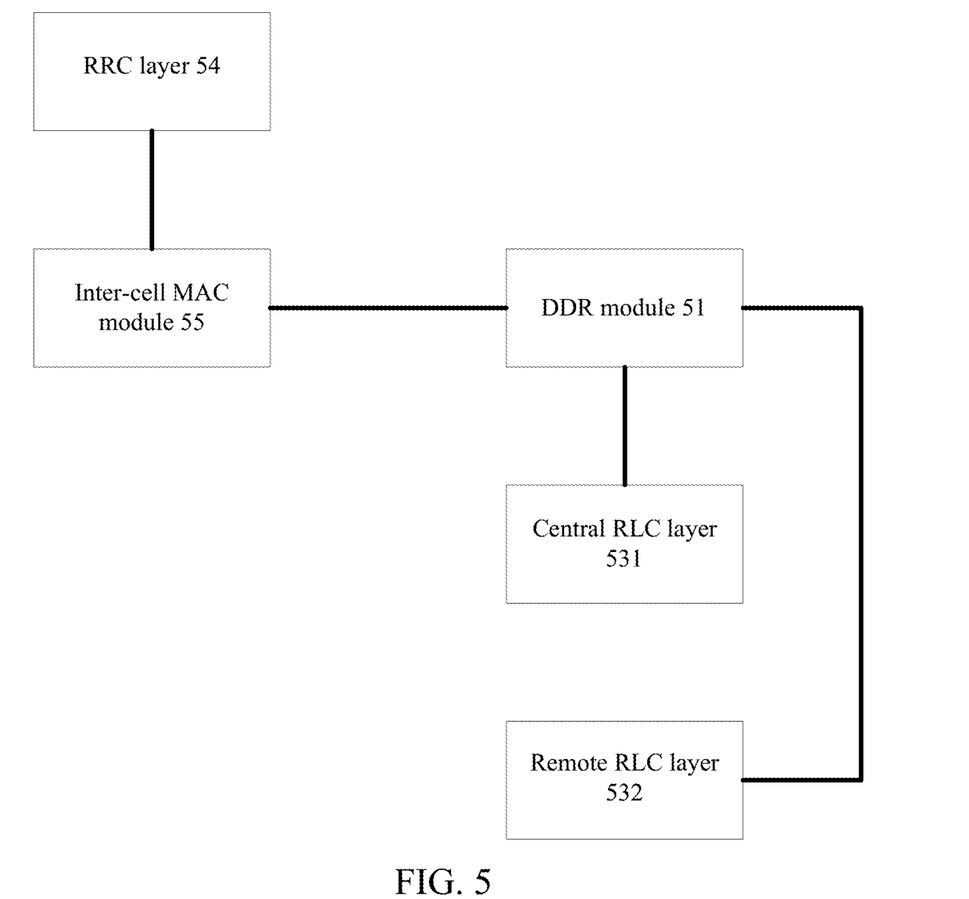
FIG. 5 is a schematic view showing a self-adaptive access network architecture system according to one embodiment of the present disclosure.

As shown in FIG. 5, the present disclosure further provides in some embodiments a self-adaptive access network architecture system which, as shown in FIG. 5, includes a data distribution and reordering module 51, a PDCP layer 52 and an RLC layer 53. The RLC layer 53 may be a central RLC layer 531 or a remote RLC layer 532.

The data distribution and reordering module 51 is configured to acquire control information, distribute data received from the PDCP layer 52 to the central RLC layer 531/the remote RLC layer 532 in accordance with the control information, reorder data received from the central RLC layer 531/the remote RLC layer 532, and transmit the reordered data to the PDCP layer 52. The control information includes information about a byte length of the data distributed over an air-interface channel and information about an air-interface link during air-interface cell switch.

In a possible embodiment of the present disclosure, the access network architecture further includes an RRC layer 54. The data distribution and reordering module 51 is further configured to receive configuration signaling from the RRC layer 54, and select whether to generate the central RLC layer 531 or the remote RLC layer 532 in accordance with the configuration signaling.

In a possible embodiment of the present disclosure, the data distribution and reordering module 51 is further configured to, when a network side is in an ideal transmission state, generate the central RLC layer 531, and when the network side is in a non-ideal transmission state, generate the remote RLC layer 532.

In a possible embodiment of the present disclosure, a function of the data distribution and reordering module 51 is configured between the PDCP layer 52 and the RLC layer 53, or in the PDCP layer 52 or the RLC layer 53.

In a possible embodiment of the present disclosure, when the function of the data distribution and reordering module 51 is configured in the PDCP layer 52, the data distribution and reordering module 51 is further configured to, when the network side is in the ideal transmission state, receive a PDCP PDU, forward the PDCP PDU to the RLC layer 53, reorder a PDCP PDU upon the receipt of the PDCP PDU reported by the RLC layer 53, and transmit the reordered PDCP PDU to the PDCP layer 52.

In a possible embodiment of the present disclosure, when the function of the data distribution and reordering module 51 is configured in the RLC layer 53, the data distribution and reordering module 51 is further configured to, when the network side is in the ideal transmission state, receive an RLC SDU from the PDCP layer 52, and enable the RLC layer 53 to distribute the data. The RLC layer 53 is configured to transmit the RLC PDU in accordance with one or more received MAC requests, and upon the receipt of data reported by an MAC layer, reorder the data and report the reordered data to the PDCP layer 52 through the data distribution and reordering module 51.

In a possible embodiment of the present disclosure, when the function of the data distribution and reordering module 51 is configured in the RLC layer 53, the data distribution and reordering module 51 is further configured to, when the network side is in the non-ideal transmission state, receive an RLC SDU from the PDCP layer 52, distribute the received data to the corresponding RLC layer 53 in accordance with a data distribution result indicated by the MAC layer, and upon the receipt of the data from a plurality of RLC layers 53, reorder the data and transmit the reordered data to the PDCP layer 52.

In a possible embodiment of the present disclosure, the access network architecture further includes an inter-cell MAC module 55 configured to transmit the control information to the data distribution and reordering module 51.

It should be appreciated that, the implementation of the functional entities in the self-adaptive access network architecture system in FIG. 5 may refer to that of the above-mentioned data processing method.

The present disclosure further provides in some embodiments a storage medium storing therein a computer program. The computer program is executed so as to implement the above-mentioned data processing method.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together. The integrated units may be implemented in the form of hardware, or in the form of hardware plus software functional units.

It should be further appreciated that, all or parts of the steps in the method may be implemented by related hardware using a program stored in a computer-readable storage medium. The program is executed so as to perform the abovementioned steps. The storage medium may include any medium capable of storing therein a program code, e.g., a mobile storage device, a Read Only Memory (ROM), a magnetic disk or an optical disk. The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium may include any medium capable of storing therein a program code, e.g., a mobile storage device, a Read Only Memory (ROM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

INDUSTRIAL APPLICABILITY

According to the embodiments of the present disclosure, a new protocol function is provided and capable of being controlled flexibly, so it may not only serve as a protocol layer but also serve as a function between two protocol layers, i.e., the protocol architecture may be adapted to different access network architecture. The protocol architecture has excellent expansibility, so it is able to support a huge number of users rapidly. In addition, the protocol architecture has excellent compatibility, so it is able to be compatible with 3G, 4G and 5G networks.

What is claimed is:
1. A data processing method adapted to access network architecture, comprising:
providing a data distribution and reordering module;
acquiring, by the data distribution and reordering module, control information;
distributing, by the data distribution and reordering module, data received from a Packet Data Convergence Protocol (PDCP) layer toward a central Radio Link Control (RLC) layer/a remote RLC layer in accordance with the control information, reordering data from the central RLC layer/remote RLC layer, and transmitting the reordered data to the PDCP layer, receiving, by the data distribution and reordering module, configuration signaling from a Radio Resource Control (RRC) layer; and selecting, by the data distribution and reordering module, whether to generate only the central RLC layer or only the remote RLC layer in accordance with the configuration signaling by:

generating, by the data distribution and reordering module, the central RLC layer, wherein the data reception and data reordering functions of the data distribution and reordering module are directly implemented as one RLC protocol functional entity; or generating, by the data distribution and reordering module, the remote RLC layer, wherein the data distribution and reordering module that is located at a central point and a plurality of RLC protocol functional entities that are located at a remote end are configured in a distributed manner, the data distribution and reordering module corresponding to the plurality of RLC protocol functional entities, wherein the data reception and data reordering functions of the data distribution and reordering module are implemented as the plurality of RLC protocol functional entities.

2. The data processing method according to claim 1, wherein the providing the data distribution and reordering module comprises: providing a data distribution and reordering layer between the PDCP layer and the RLC layer, the data distribution and reordering layer corresponding to a function of the data distribution and reordering module; or configuring the function of the data distribution and reordering module in the PDCP layer or the RLC layer.

3. The data processing method according to claim 2, wherein when the function of the data distribution and reordering module is configured in the PDCP layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer comprises, when a network side is in an ideal transmission state, receiving, by the data distribution and reordering module, a PDCP Packet Data unit (PDU), forwarding the PDCP PDU to the RLC layer, receiving a PDCP PDU reported by the RLC Layer, reordering the reported PDCP PDU, and transmitting the reordered PDCP PDU to the PDCP layer.

4. The data processing method according to claim 2, wherein when the function of the data distribution and reordering module is configured in the RLC layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer comprises: when a network side is in an ideal transmission state, receiving, by the data distribution and reordering module, an RLC Service Data Unit (SDU) from the PDCP layer, and enabling the RLC layer to distribute the data; transmitting, by the RLC layer, an RLC PDU in accordance with one or more received Media Access Control (MAC) requests; and after the RLC layer has received data reported by an MAC layer, reordering the received data and reporting, by the data distribution and reordering module, the reordered data to the PDCP layer.

5. The data processing method according to claim 2, wherein when the function of the data distribution and reordering module is configured in the RLC layer, the distributing, by the data distribution and reordering module, the data received from the PDCP layer toward the central RLC layer/the remote RLC layer, reordering the data from the central RLC layer/the remote RLC layer and transmitting the reordered data to the PDCP layer comprises: when a network side is in a non-ideal transmission state, receiving, by the data distribution and reordering module, an RLC SDU from the PDCP layer, and distributing the received data to the corresponding RLC layer in accordance with a data distribution result indicated by an MAC layer; and upon the receipt of data from a plurality of RLC layers, reordering, by the received data distribution and reordering module, the data and transmitting the reordered data to the PDCP layer.

6. The data processing method according to claim 1, further comprising providing an inter-cell MAC module, wherein the acquiring, by the data distribution and reordering module, the control information comprises transmitting, by the inter-cell MAC module, the control information to the data distribution and reordering module, and wherein the control information comprises information about a byte length of the data distributed over an air-interface channel and information about an air-interface link during air-interface cell switch.

7. A self-adaptive access network architecture system, comprising:

a data distribution and reordering module, a PDCP layer and an RLC layer, wherein the data distribution and reordering module acquires control information, distributes data received from the PDCP layer to a central RLC layer/a remote RLC layer in accordance with the control information, reorders data received from the central RLC layer/the remote RLC layer, and transmits the reordered data to the PDCP layer, wherein the data distribution and reordering module further receives configuration signaling from a Radio Resource Control (RRC) layer; and selects whether to generate only the central RLC layer or only the remote RLC layer in accordance with the configuration signaling, wherein the data distribution and reordering module further generates the central RLC layer, wherein the data reception and data reordering functions of the data distribution and reordering module are directly implemented as one RLC protocol functional entity; or wherein the data distribution and reordering module further generates the remote RLC layer, wherein the data distribution and reordering module that is located at a central point and a plurality of RLC protocol functional entities that are located at a remote end are configured in a distributed manner, the data distribution and reordering module corresponding to the plurality of RLC protocol functional entities, wherein the data reception and data reordering functions of the data distribution and reordering module are implemented as the plurality of RLC protocol functional entities.

8. The self-adaptive access network architecture system according to claim 7, wherein a function of the data distribution and reordering module is realized between the PDCP layer and the RLC layer, or in the PDCP layer or the RLC layer.

9. The self-adaptive access network architecture system according to claim 8, wherein when the function of the data distribution and reordering module is realized in the PDCP layer, the data distribution and reordering module further receives, when a network side is in an ideal transmission state, a PDCP PDU, forwards the PDCP PDU to the RLC layer, reorders the PDCP PDU upon the receipt of a PDCP PDU reported by the RLC layer, and transmits the reordered PDCP PDU to the PDCP layer.

10. The self-adaptive access network architecture system according to claim 8, wherein when the function of the data distribution and reordering module is realized in the RLC layer, the data distribution and reordering module further receives, when a network side is in an ideal transmission state, an RLC SDU from the PDCP layer, and enables the RLC layer to distribute the data; and the RLC layer transmits the RLC PDU in accordance with one or more received MAC requests, and upon the receipt of data reported by an MAC layer, reorders the data and report the reordered data to the PDCP layer through the data distribution and reordering module.

11. The self-adaptive access network architecture system according to claim 8, wherein when the function of the data distribution and reordering module is realized in the RLC layer, the data distribution and reordering module further receives, when a network side is in a non-ideal transmission state, an RLC SDU from the PDCP layer, distributes the received data to the corresponding RLC layer in accordance with a data distribution result indicated by the MAC layer, and upon the receipt of the data from a plurality of RLC layers, reorders the data and transmit the reordered data to the PDCP layer.

12. The self-adaptive access network architecture system according to claim 7, further comprising an inter-cell MAC module, wherein the inter-cell MAC module transmits the control information to the data distribution and reordering module, wherein the control information comprises information about a byte length of the data distributed over an air-interface channel and information about an air-interface link during air-interface cell switch.

13. A non-transitory computer-readable storage medium storing therein a computer program, wherein the computer program is executed so as to implement a data processing method adapted to access network architecture, comprising:
   providing a data distribution and reordering module;
   acquiring, by the data distribution and reordering module, control information;
   distributing, by the data distribution and reordering module, data received from a Packet Data Convergence Protocol (PDCP) layer toward a central Radio Link Control (RLC) layer/a remote RLC layer in accordance with the control information, reordering data from the central RLC layer/remote RLC layer, and transmitting the reordered data to the PDCP layer,
   receiving, by the data distribution and reordering module, configuration signaling from a Radio Resource Control (RRC) layer; and
   selecting, by the data distribution and reordering module, whether to generate only the central RLC layer or only the remote RLC layer in accordance with the configuration signaling by:
      generating, by the data distribution and reordering module, the central RLC layer, wherein the data reception and data reordering functions of the data distribution and reordering module are directly implemented as one RLC protocol functional entity; or
      generating, by the data distribution and reordering module, the remote RLC layer, wherein the data distribution and reordering module that is located at a central point and a plurality of RLC protocol functional entities that are located at a remote end are configured in a distributed manner, the data distribution and reordering module corresponding to the plurality of RLC protocol functional entities, wherein the data reception and data reordering functions of the data distribution and reordering module are implemented as the plurality of RLC protocol functional entities.

14. The non-transitory computer-readable storage medium according to claim 13, wherein the providing the data distribution and reordering module comprises: providing a data distribution and reordering layer between the PDCP layer and the RLC layer, the data distribution and reordering layer corresponding to a function of the data distribution and reordering module; or configuring the function of the data distribution and reordering module in the PDCP layer or the RLC layer.

* * * * *